Patented Nov. 24, 1931

1,833,865

UNITED STATES PATENT OFFICE

EMIL LÜSCHER, OF BASEL, SWITZERLAND, ASSIGNOR TO THE FIRM: LONZA ELEK-TRIZITATSWERKE UND CHEMISCHE FABRIKEN AKTIENGESELLSCHAFT, OF BASEL, SWITZERLAND

MANUFACTURE OF CALCIUM FORMATE

No Drawing. Application filed March 13, 1929, Serial No. 346,810, and in France, Belgium, Austria, and Sweden December 17, 1928.

In the production of formates with the aid of dissolved alkalies and oxide of carbon it has hitherto been considered desirable to work with solutions diluted as far as possible. On the other hand experiments with solid alkali metal hydroxides, oxides and carbonates and alkali-earth metal hydroxides, oxides and carbonates show that if an unusually long reaction period is not available a certain quantity of the hydroxides always remains unaltered and is contained in the formate produced. The German patent specification No. 383,538 for that reason recommends a mechanical pulverization of the reaction material. As can easily be seen, the use of diluted solutions involves high evaporation costs, whilst the mechanical pulverization of alkali metal hydroxides, oxides and carbonates and alkali-earth metal hydroxides, oxides and carbonates is not easy to be carried out under the pressure and temperature conditions which come into question in this case.

It has now been discovered that these disadvantages are avoided if in the production of solid calcium formate from calcium oxide and carbon monoxide under pressure and at a raised temperature the reaction products are caused to interact under intensive mixing within a calcium formate solution which is saturated in calcium formate, the solid salt being separated off after the reaction is completed and the remaining solution being used anew as starting liquid.

Example 211 g. of lime are slaked with the necessary quantity of water and together with 800 ccm. of a calcium formate solution saturated at ordinary room temperature are put into a stirring autoclave. Then the air is removed by being blown out by means of carbon monoxide (CO) and the whole is heated under a carbon monoxide pressure of 80 atmospheres to 160° C. and kept at this temperature. Whilst being stirred vigorously, carbon monoxide (CO) is pressed in, at about 80 atmospheres measured in the autoclave. After about 3 hours the absorption is practically finished. The reaction mass consisting of crystals of calcium formate as precipitate and of calcium formate solution is separated by way of filtration.

The quantity of calcium formate newly formed in 4 hours active reaction period corresponds to 311 g. of formic acid. Thus about 77 g. of formic acid in the form of formate are produced per hour.

The quantity actually formed corresponds to about 95% of the theoretical quantity.

What I claim is:—

A process for the production of solid calcium formate by the reaction of calcium hydroxide and carbon monoxide under superatmospheric pressure and at a temperature of 140 to 180° C., consisting in causing the reaction products to interact, while being intensively mixed, within a calcium formate solution which is saturated in calcium formate, separating the solid salt after the reaction is completed and using the remaining solution anew as starting liquid.

In witness whereof I have hereunto signed my name this 25th day of February 1929.

EMIL LÜSCHER.